United States Patent
Isogai et al.

(10) Patent No.: US 6,181,884 B1
(45) Date of Patent: *Jan. 30, 2001

(54) IMAGE PRODUCING APPARATUS HAVING AN IMAGE READING UNIT

(75) Inventors: Yoshitaka Isogai, Kawasaki (JP); Henry Chin, Portland, OR (US); Steve McCallion, Portland, OR (US); Scott Thorpe, Portland, OR (US); Peter Wyatt, Los Angeles, CA (US)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/050,040

(22) Filed: Mar. 30, 1998

(51) Int. Cl.[7] .............................. G03G 15/00; H04N 1/00
(52) U.S. Cl. ................................. 399/1; 358/296; 399/363
(58) Field of Search .............................. 399/1, 2, 4, 363; 358/296, 401, 496, 498; 347/3

(56) References Cited

U.S. PATENT DOCUMENTS

| | | |
|---|---|---|
| 4,743,941 * 5/1988 | Takano | 399/21 |
| 5,028,957 7/1991 | Sakamoto . | |
| 5,038,228 * 8/1991 | Takada | 358/498 |
| 5,359,425 * 10/1994 | Machara et al. | 358/300 |
| 5,751,448 * 5/1998 | Kim et al. | 358/498 |
| 5,996,995 * 12/1999 | Kim et al. | 271/303 |

FOREIGN PATENT DOCUMENTS 63-163376 * 7/1988 (JP) .
9-321924 * 12/1997 (JP) .

* cited by examiner

Primary Examiner—Joan Pendegrass
(74) Attorney, Agent, or Firm—McDermott, Will & Emery (57) ABSTRACT

An image producing apparatus comprises a paper passage route which conveys paper selectively from a manual paper-feed unit and a paper feed unit, and conveys paper discharged from a print unit, and an image reading unit which reads out images of a document conveyed in the paper passage route. In a usual state, printed output is produced on the paper contained in the paper feed unit of a body, and the manual paper-feed unit is kept vacant, then, there is no need to take out the paper in the case of loading the document to be read out in the manual paper-feed tray. Moreover, the apparatus does not have a paper feed tray, a discharge tray and a paper passage route used only for image reading, which can decrease manufacturing costs, and besides, makes it possible to take up less installation space.

18 Claims, 8 Drawing Sheets

IMAGE PRODUCING APPARATUS HAVING AN IMAGE READING UNIT

BACKGROUND OF THE INVENTION

This invention relates to an image producing apparatus having an image reading unit, and more particularly, to a multi-function printer, a facsimile machine or a facsimile and scanner machine.

Conventionally, in a printer having an image reading unit, it has been known that the image reading unit is contained inside a printer unit thereof, and a paper passage route for printing also acts as a paper conveying passage for conveying a document in an image reading operation. Moreover, in a conventional facsimile machine or a conventional facsimile and scanner machine, an image reading unit for facsimile is shared as a scanner for reading out images for a personal computer.

However, the above-mentioned conventional printer in which the paper is fed from the only one paper feed tray of a body, entails a trouble of removing the paper from the paper feed tray in every time of image reading operation.

Moreover, in the above-mentioned conventional facsimile and scanner machine, a paper feed tray for feeding a document to the image reading unit, a discharge tray and a paper passage route of the document can not be shared as a paper passage route for the printing unit, so that the apparatus itself becomes upsized, and takes up a larger installation space. Furthermore, the apparatus consists of a larger amount of components, so that the apparatus entails high manufacturing costs.

SUMMARY OF THE INVENTION

The present invention is made to solve the above-mentioned problems. One object of the invention is to provide a less expensive multi-function image producing apparatus having an image reading unit, which does not entail the trouble of removing the paper from the paper feed tray in every time of image reading operation, and does not require the larger installation space since the paper passage route for the document to be read out and the paper passage route of the printing unit are shared with each other.

In order to achieve the above-described object, an image producing apparatus having an image reading unit, comprises: a body; an image producing unit which is contained in the body; a first paper feed unit which feeds the paper into the image producing unit; a second paper feed unit which feeds the paper into the image producing unit; a paper stack which contains the paper discharged from the image producing unit; a paper conveying passage which conveys the paper selectively from the first paper feed unit and the second paper feed unit, and conveys the paper discharged from the image producing unit into the paper stack; and, an image reading unit which reads out images on the paper conveyed in the paper conveying passage.

In the above-described construction, paper for printing are usually contained in the second paper feed unit (used as a paper feed unit only for printing), and the first paper feed unit can be kept vacant for acting as a manual paper-feed unit in a usual state. Accordingly, a trouble of removing the paper from the paper feed tray, can be avoided in the case of loading a document to be read out in the manual paper-feed tray. Besides, since the apparatus dispenses with a paper feed tray and a discharge tray used only for the image reading, the apparatus can be downsized, and take up less installation space. Furthermore, the apparatus of the present invention includes fewer components, so that the manufacturing costs can be decreased.

DETAILED DESCRIPTION OF THE PREFERRED EMBODIMENT OF THE PRESENT INVENTION

Some embodiments of the present invention will be described hereinafter with the accompanying drawings. FIGS. 1(a)–1(d) are views showing a structure of a multi-function printer 100 having an image reading unit according to a first embodiment. The multi-function printer 100 has a body 1 which is covered by a box-shaped housing, and contains a printing unit (image producing unit) 2 (e.g. laser printer etc.) inside thereof. The printer 100 comprises a paper feed unit (second paper feed unit) 3 included in the body 1, a manual paper-feed unit (first paper feed unit) 4, a discharge unit (paper stack) 5, a fixing unit 6, a paper passage route 7 (paper conveying passage, denoted by dot lines in the figures) and an image reading unit 8. In such a construction, the paper feed unit 3 feeds the paper P into the printing unit 2 with paper feed rollers (not shown in the figure) etc., the manual paper-feed unit 4 consists of a tray for manual sending of paper into the printing unit 2, and the discharge unit 5 contains paper discharged from the printing unit 2. Further, the fixing unit 6 fixes toner of the produced images on the paper P in the printing unit 2, and the paper passage route 7 conveys the paper selectively from the paper feed unit 3 or the manual paper-feed unit 4, and conveys the paper discharged from the printing unit 2 to the discharge unit 5, and the image reading unit 8 reads out images on the paper conveyed in the paper passage route 7. The printer 100 also comprises an input unit which commands to start to copy, an input unit which commands to start to read out the image, and a control device which controls the actions in each of operation modes.

Figure 1:
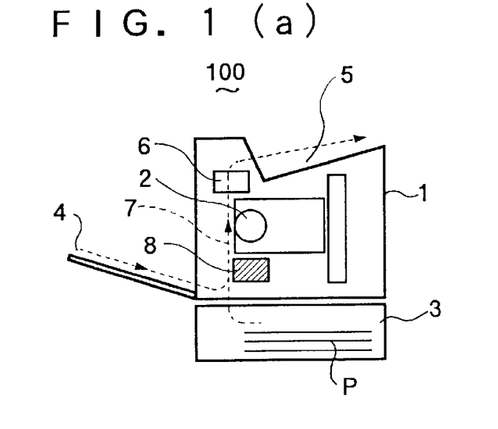
FIGS. 1(a), 1(b), 1(c) and 1(d) are longitudinal sectional views showing a multi-function printer having an image reading unit according to a first embodiment of the present invention.

The discharge unit 5 is arranged on a top surface of the body 1 in FIGS. 1(a)–1(c), and composed by a tray in FIG. 1(d). In FIGS. 1(a) and 1(c), the image reading unit 8 is located on the paper passage route 7 between the paper feed unit 3 and the manual paper-feed unit 4, and the printing unit 2. On the other hand, in FIGS. 1(b) and 1(d), the image reading unit 8 is located on the paper passage route 7 between the manual paper-feed unit 4 and the printing unit 2. The image reading unit 8 is composed of a line sensor unit consisting of a plurality of line sensors which are aligned in a direction vertical to a paper conveying direction.

When printed output is produced in the above-structured printer 100, the paper that is fed from the paper feed tray 3 or the manual paper-feed tray 4, are passed through the printing unit 2 by the guide of the dot-lined paper passage route 7, and then, discharged into the discharge unit 5. The printer 100 prints out data which is transmitted from an external device, or image data which is read out. When the images are read out, a document which is loaded on the manual paper-feed unit 4, is also sent into the paper passage route 7, read out by the image reading unit 8, and then discharged into the discharged unit 5 just as in the case of the print mode.

Using the manual paper-feed unit 4 for loading the document to be read out, the manual paper-feed unit 4 is kept vacant in a usual state (in other operation modes than the image reading mode), which avoids the troublesome action of removing the paper for printing as in the conventional case. Moreover, there is no need to provide a paper feed tray, a discharge tray and a paper passage route used only for image reading in the apparatus of the present invention, which allows the apparatus to be downsized.

When a command of starting to copy is received from the input unit, a document (first paper) is fed from the manual paper-feed unit 4, and images of it are read out by the image reading unit 8. At the time, a paper P (second paper) is fed from the paper feed unit 3, and the image is produced on the paper P based on the image data read out by the image reading unit 8, thereby an error printing (e.g. making a copy on the document to be read out) can be prevented. Furthermore, when a command of reading out images is received from the input unit, the document which is loaded on the manual paperfeed unit 4 (first paper), is fed, and images of it are read out by the image reading unit 8.

Figure 2:
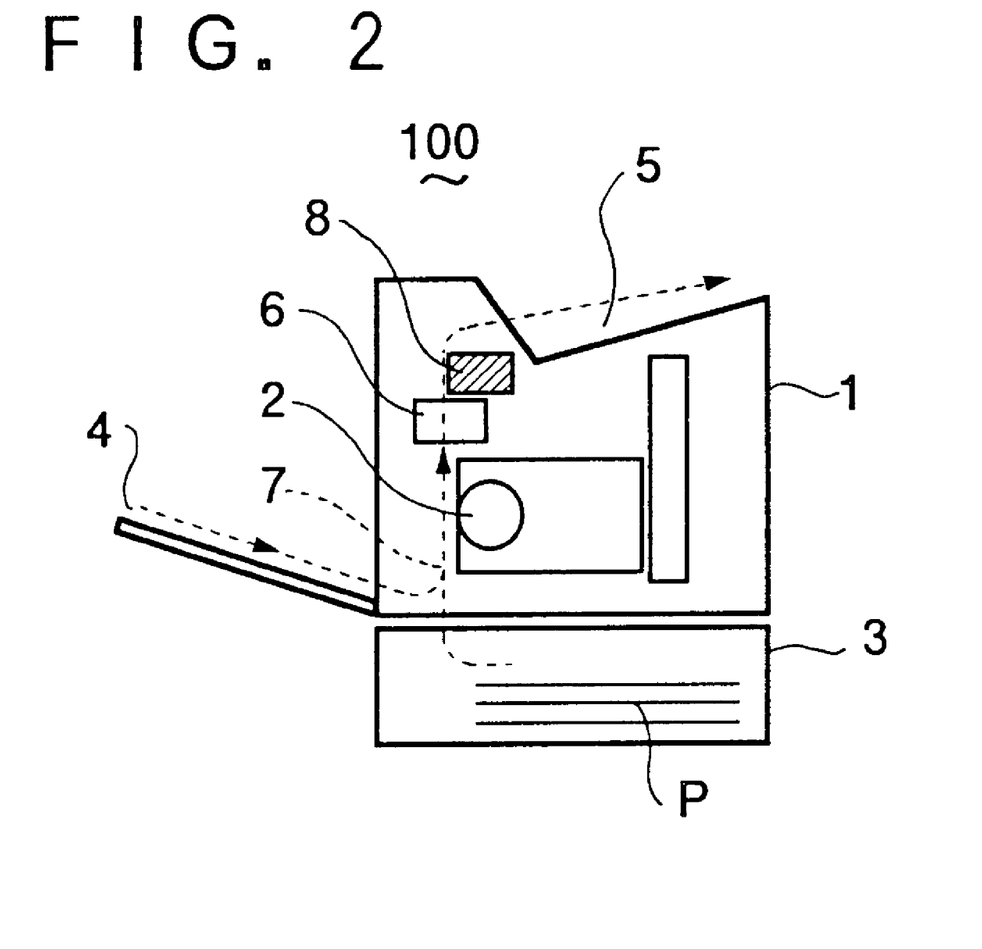
FIG. 2 is a longitudinal sectional view of a multi-function printer according to a second embodiment of the present invention.

FIG. 2 is a view showing a structure of a multi-function printer having an image reading unit according to a second embodiment of the present invention. In the present embodiment, the image reading unit 8 is arranged behind the printing unit 2. In the printing operation, paper that is fed from the paper feed tray 3 or the manual paper-feed tray 4, are passed through the printing unit 2 by the guide of the dot-lined paper passage route 7, and then, discharged into the discharge unit 5. When images are read out, a document which is loaded on the manual paper-feed unit 4, is also sent into the paper passage route 7, read out on the paper passage route 7 by the image reading unit 8 which is located closer to a paper discharge side, and then discharged into the discharge unit 5.

Figure 3:
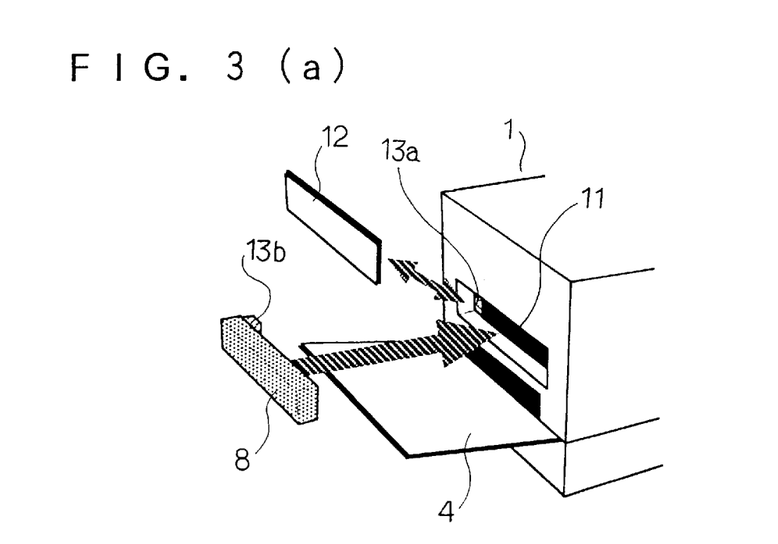
FIG. 3(a) is a perspective view showing a multi-function printer having an image reading unit according to a third embodiment of the present invention.
FIG. 3(b) is a view showing a state that the image reading unit is detached and a state that the image reading unit is attached in the third embodiment.

FIG. 3(a) is a view showing a structure of a multi-function printer having an image reading unit according to a third embodiment of the present invention. In the present embodiment, the image reading unit 8 can be detached from the body 1. The body 1 is furnished above the paper feed unit 4 with an opening 11 into which the image reading unit 8 is attached. The opening 11 is covered by an exterior cover 12, and if the exterior cover 12 is taken off, the image reading unit 8 can be inserted into a space inside the body 1. The image reading unit 8 being inserted, the image reading unit 8 and the body 1 are electrically connected with each other by an electrical contact 13a inside the body 1 and an electrical contact 13b of the image reading unit 8 contacting each other, thereby power and signal are exchanged between the image reading unit 8 and the body 1. After inserting the image reading unit 8, the exterior cover 12 can be attached on the opening 11. The image reading unit 8 which is inserted as mentioned above, can be detached in a retrograde order of the above-described procedure. FIG. 3(b) shows a state that the image reading unit 8 is detached and a state that the image reading unit 8 is attached in the third embodiment.

When images are produced on the paper, a control is executed so that the paper for image producing (printing) are fed from the paper feed tray 3 of the body when the image reading unit 8 is attached, and fed selectively from the manual paper-feed tray 4 or the paper feed tray 3 of the body when the image reading unit 8 is detached. The printer 100 comprises a control device for executing this control. This control can prevent an error printing that the image is produced on the document to be read out which is loaded in the manual paper-feed tray 4. Further, the control device executes a control so that a command of starting to copy or to read out images is not received when the image reading unit 8 is not attached. Therefore, troublesome actions can be avoided.

Figure 4:
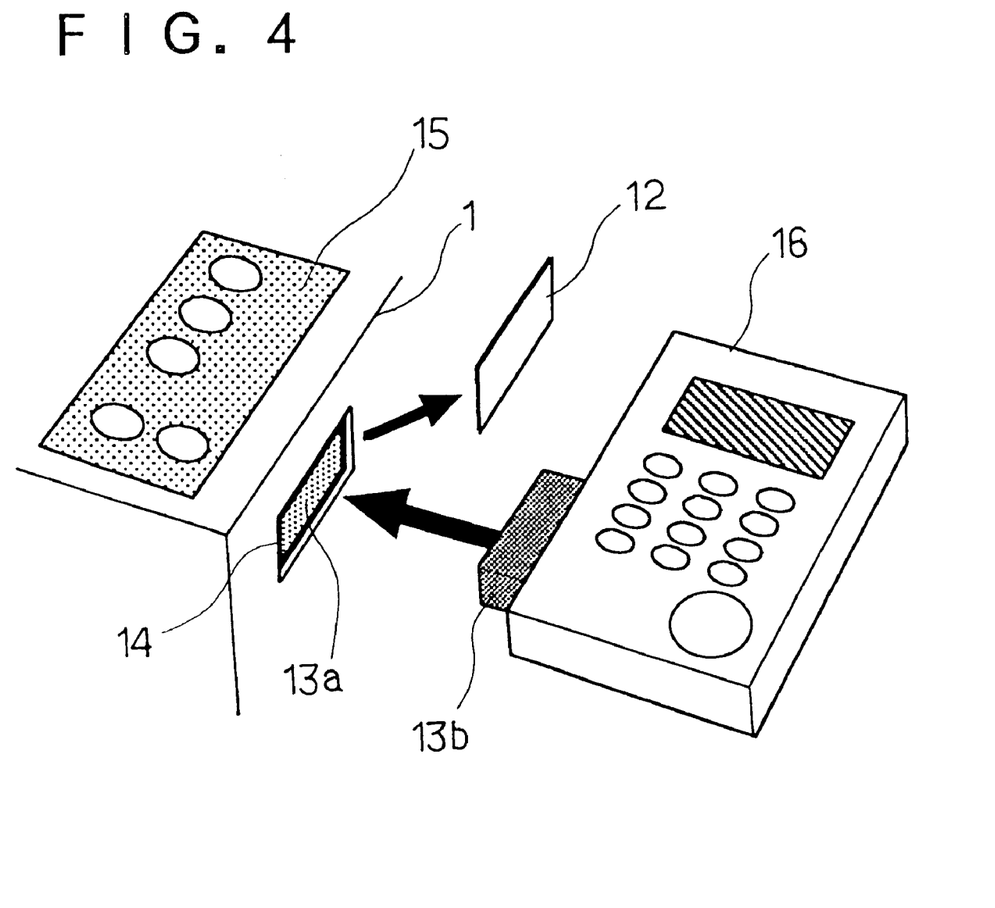
FIG. 4 is a view showing a structure of an add-in operation unit for providing an image reading and facsimile function to a printer according to a fourth embodiment of the present invention.

FIG. 4 is a view showing a structure of an add-in operation unit for providing an image reading and facsimile function to a printer according to a fourth embodiment of the present invention. As shown in the figure, the body 1 has a slot 14 which is arranged on a side surface near an operation setting unit 15, and into which the add-in operation unit (input unit) 16 is attached. Taking off the exterior cover 12 which covers the slot 14, the add-in operation unit 16 can be inserted into the slot 14. Accordingly, the add-in operation unit 16 and the body 1 are electrically connected with each other by an electrical contact 13a inside the body 1 and an electrical contact 13b of the add-in operation unit 16 contacting each other, thereby power and signal are exchanged between the add-in operation unit 16 and the body 1. In the present embodiment, the image reading unit can also be added in, so that, although the printer itself is a single-function apparatus, the apparatus can perform an image reading function and a facsimile function by means of adding this unit.

Figure 5:
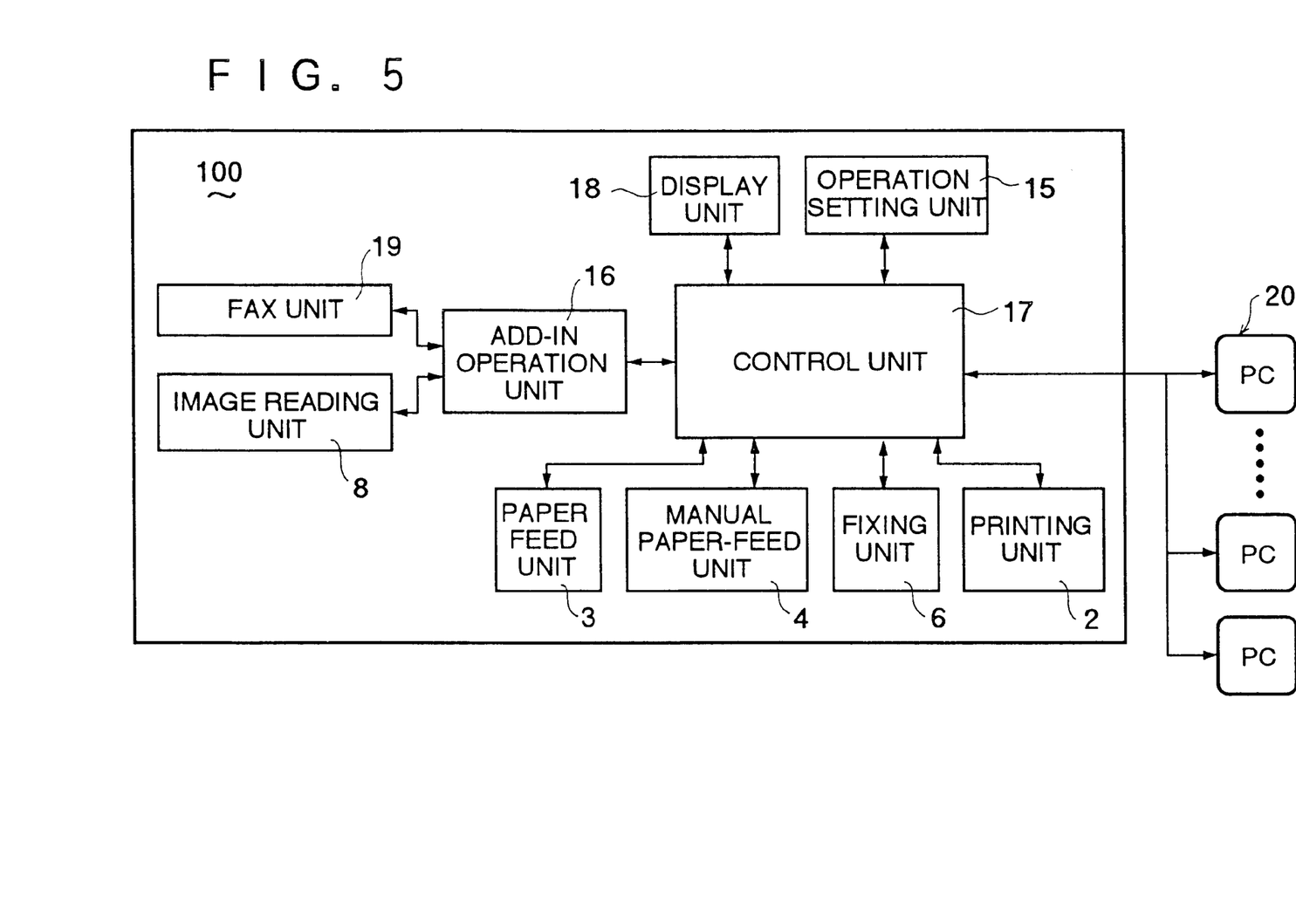
FIG. 5 is a circuit diagram in the case that a detachable image reading unit and a facsimile unit are added in a printer according to a fifth embodiment of the present invention.

FIG. 5 is a circuit diagram in the case that a detachable image reading unit and a facsimile unit are added in a printer according to a fifth embodiment of the present invention. The printer 100 comprises a control unit (control device) 17 to which a display unit 18 and the add-in operation unit 16 are connected as well as the above-mentioned components, and the add-in operation unit 16 can control a facsimile unit 19 and the image reading unit 8. Further, the control unit 17 also comprises a transmitting function (transmitting unit) by which data can be transmitted to an external device such as a personal computer (PC) 20 connected via communications lines. The transmitting function can transmit the data such as the image data which is read out by the image reading unit 8 into a transmitted target specified by the add-in operation unit 16.

Figure 6:
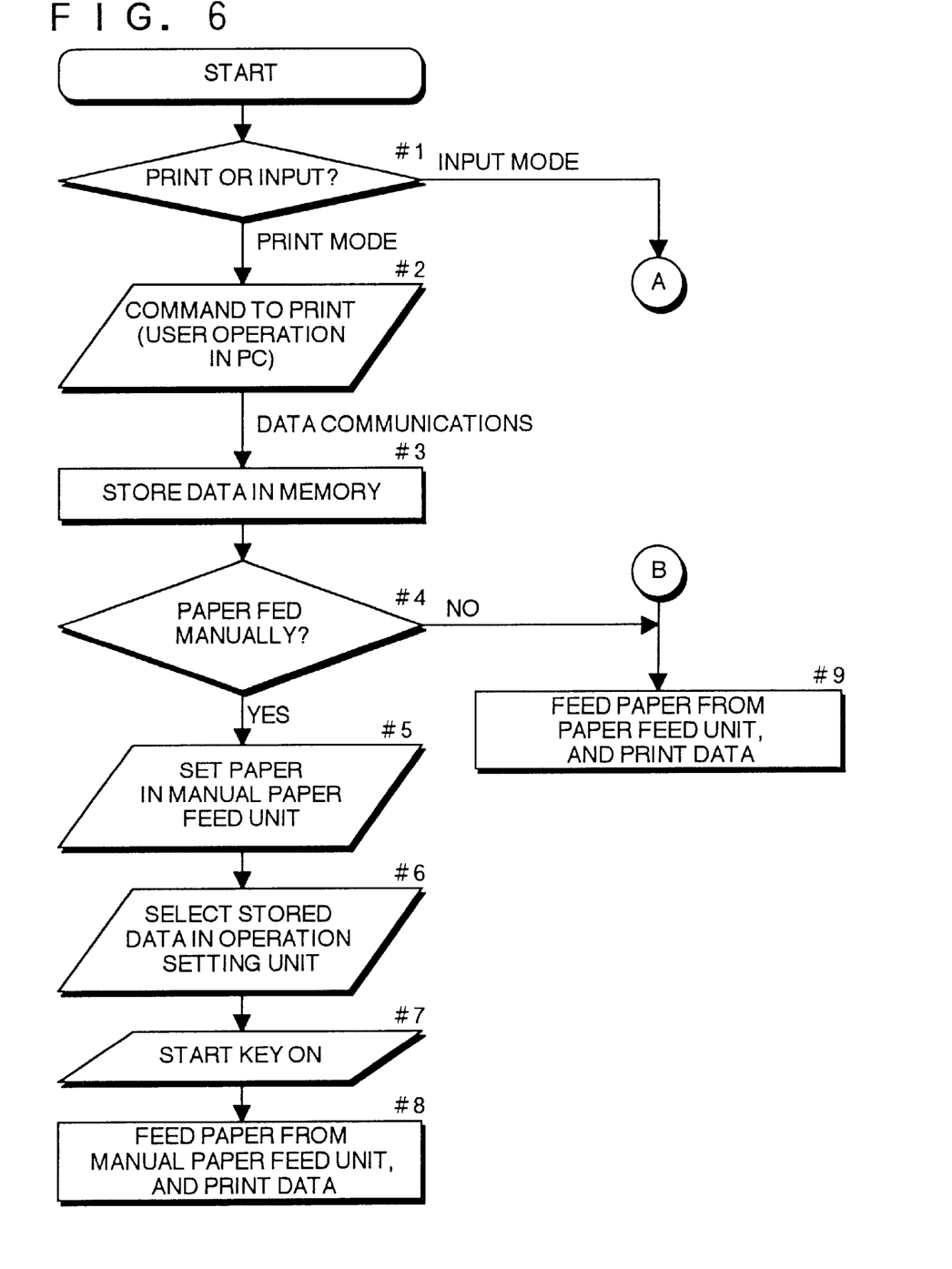
FIG. 6 is a flowchart explaining a procedure for operating and controlling the printer having a circuit structure of the fifth embodiment.
Figure 7:
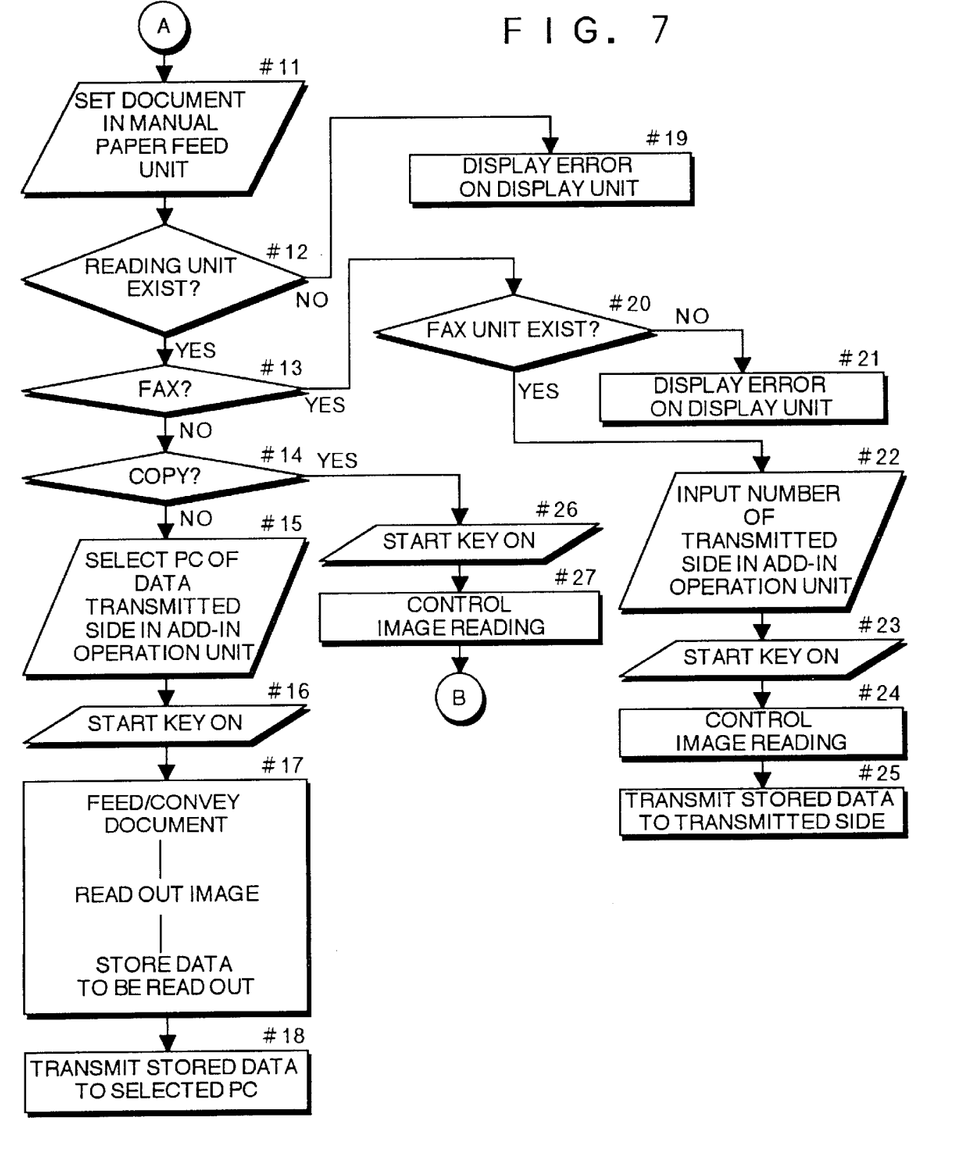
FIG. 7 is a flowchart explaining a procedure for operating and controlling the printer having the circuit structure of the fifth embodiment, and, FIG. 8 is a flowchart in which part of the procedure explained in FIG. 6 is modified.

FIGS. 6 and 7 are flowcharts explaining procedures for operating and controlling the printer having a circuit structure according to the fifth embodiment of the present invention. The printer has a structure such that the image reading unit and facsimile unit can be detached therefrom. The control unit 17 examines which mode is set in the operation setting unit 15, print or input (image reading) (#1). In the print mode, when a user commands to print (#2), the data is stored in a memory (not shown in the figure) by means of data communications (#3). Then, it is examined that the manual paper-feeding mode is set (#4), and when it is NO, paper is fed from the paper feed unit 3, and the stored data is produced in printed output (#9). When it is YES, the user sets the paper in the manual paper-feed unit 4 (#5), and selects the stored data with the operation setting unit 15 (#6). After the start key is ON (#7), the paper is conveyed from the manual paper-feed unit 4, and the selected data is produced in printed output (#8).

If the input mode is set at #1, the procedure goes to #11, and the user loads a document in the manual paper-feed unit 4. It is judged whether the image reading unit 8 exists (#12). When it is YES, it is examined that the facsimile mode is set in the operation setting unit 15 by the user (#13). When it is NO, it is examined that the copy mode is set in the operation setting unit 15 by the user (#14). When it is NO, it is judged the scanning mode, and the user selects a personal computer (PC) to which the data is transmitted (#15). When the start key is ON (#16), a control is executed for image reading (#17). In this process, a control for feeding/conveying the document, a control for reading out the document and a control for storing the data to be read out, these are executed. After that, the control unit 17 transmits the stored data to the specified personal computer.

When it is NO at #12 (the image reading unit 8 does not exist), the display unit 18 displays an error (#19). If it is YES at #13, which means the facsimile mode, it is judged whether the facsimile unit 19 exists (#20). When it is NO, the display unit 18 notifies an error (#21). When it is YES, the user inputs a number of the transmitted side with the add-in operation unit 16 (#22). After the start key is ON (#23), a control for image reading is executed (#24), and the stored data is transmitted to the transmitted side (#25). If it is YES at #14, it means the copy mode. When the start key is ON (#26), a control is executed for image reading (#27), and the procedure goes back to the above-mentioned step #9.

Figure 8:
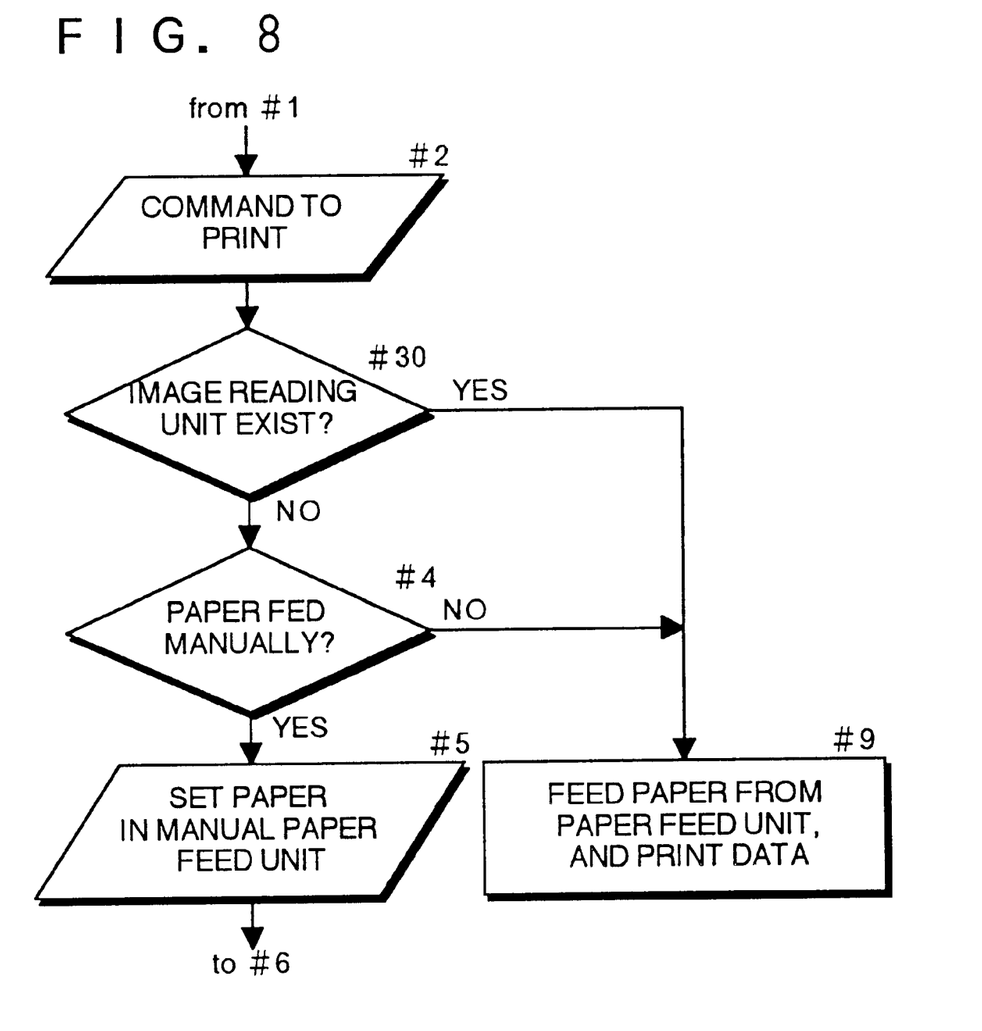

FIG. 8 is a flowchart in which part of the procedure explained in FIG. 6 is modified. This procedure includes a step that it is examined whether the image reading unit 8 is attached in the print mode (#30). When the image reading unit 8 is attached in the print mode, the paper is fed from the paper feed unit 3; on the other hand, when the image reading unit 8 is detached, the paper is fed selectively from the manual paper-feed unit 4 and paper feed unit 3, which can prevent from an error printing that the image is printed on a document loaded in the manual paper-feed tray 4.

Moreover, the printer of the present embodiment has the image reading unit 8 which is composed of the line sensors, thereby, a larger amount of images can be read out in a unit of time, and the images can be read out in a shorter time.

As many apparently widely different embodiments of this invention may be made without departing from the spirit and scope thereof, it is to be understood that the invention is not limited to the specific embodiments thereof except as defined in the appended claims.

What is claimed is:

1. An image producing apparatus having an image reading unit comprising:
    a body;
    an image producing unit which is contained in the body;
    a first paper feed unit which feeds paper into the image producing unit for producing images;
    a second paper feed unit which feeds the paper into the image producing unit for producing images;
    a paper stack which contains the paper discharged from the image producing unit;
    a paper conveying passage which conveys the paper selectively from the first paper feed unit and the second paper feed unit, and conveys the paper discharged from the image producing unit into the paper stack;
    a programmable control unit for controlling the selectivity of said paper from said first paper feed unit and said second paper feed unit when paper is set in both the first and second paper feed units; and
    an image reading unit which reads out images on the paper conveyed in the paper conveying passage.

2. An image producing apparatus as claimed in claim 1, wherein the first paper feed unit contains the paper so that the paper is partially seen from outside.

3. An image producing apparatus as claimed in claim 2, wherein the image reading unit reads out the images on the paper fed from the first paper feed unit.

4. An image producing apparatus as claimed in claim 3, wherein the image reading unit is located in the paper conveying passage between the first paper feed unit and the image producing unit.

5. An image producing apparatus as claimed in claim 3, wherein the image reading unit is located in the paper conveying passage between the image producing unit and the paper stack.

6. An image producing apparatus as claimed in claim 1, wherein the image reading unit is repeatedly detachable and reattachable to and from the body, said body having a port for receiving said image receiving unit.

7. An image producing apparatus as claimed in claim 6, wherein
    the control device executes a control for feeding the paper from the second paper feed unit when the image reading unit is attached on the body, and executes a control for feeding the paper selectively from the first paper feed unit and the second paper feed unit when the image reading unit is detached from the body.

8. An image producing apparatus as claimed in claim 1, further comprising:
    an input unit which commands to start to copy; and,
    a control device which, based on the command from the input unit, executes a control for feeding the first paper from the first paper feed unit with reading out images on the fed first paper, and feeding the second paper from the second paper feed unit with producing the images on the fed second paper based on the images read out by an image reading unit.

9. An image producing apparatus as claimed in claim 8, wherein the input unit is detachable from the body.

10. An image producing apparatus as claimed in claim 8, wherein the image reading unit is detachable from the body, and when the image reading unit is detached from the body, the control device does not receive the command to start to copy from the input unit.

11. An image producing apparatus as claimed in claim 1, further comprising:
    an input unit which commands to start to read out images; and,
    a control device which executes a control for feeding the first paper from the first paper feed unit, and reading out the images on the fed first paper in the image reading unit.

12. An image producing apparatus as claimed in claim 11, wherein the input unit is detachable from the body.

13. An image producing apparatus as claimed in claim 11, further comprising:

a transmitting unit which transmits the images read out by the image reading unit into an external device over a communications line.

14. An image producing apparatus as claimed in claim 13, further comprising:

an input unit which is detachably disposed on the body, and specifies a transmitted side to which the images read out by the image reading unit are transmitted.

15. An image producing apparatus as claimed in claim 11, wherein the image reading unit is detachable from the body, and when the image reading unit is detached from the body, the control device does not receive the command to start to copy from the input unit.

16. An image producing apparatus as claimed in claim 1, wherein the image reading unit has a line sensor unit consisting of a plurality of line sensors which are aligned in a direction vertical to a paper conveying direction.

17. An image producing apparatus as claimed in claim 16, wherein the image producing unit produces images sequentially in a line along with the direction vertical to a paper conveying direction.

18. A method for conveying paper and a method for reading out images in an image producing apparatus having an image reading unit, comprising the following steps:

a step for conveying the paper selectively from a first paper feed unit and a second paper feed unit for feeding paper to an image producing unit for producing images when paper is set in both the first and second paper feed units, said selectivity governed by a programmable control unit operative for controlling the selectivity of said paper from said first paper feed unit and said second paper feed unit;

a step for conveying the paper discharged from the image producing unit into a paper stack; and a step in which the image reading unit disposed on a paper conveying passage, reads out images on the paper conveyed into the paper conveying passage.

* * * * *